US012718332B2

(12) United States Patent
Chen

(10) Patent No.: US 12,718,332 B2
(45) Date of Patent: Aug. 25, 2026

(54) GAME INTERACTION CONTROL METHOD AND APPARATUS, STORAGE MEDIUM AND ELECTRONIC DEVICE

(71) Applicant: Beijing Zitiao Network Technology Co., Ltd., Beijing (CN)

(72) Inventor: Lang Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 211 days.

(21) Appl. No.: 18/834,209

(22) PCT Filed: Jan. 13, 2023

(86) PCT No.: PCT/CN2023/072098
§ 371 (c)(1),
(2) Date: Jul. 29, 2024

(87) PCT Pub. No.: WO2023/143129
PCT Pub. Date: Aug. 3, 2023

(65) Prior Publication Data

US 2025/0117891 A1 Apr. 10, 2025

(30) Foreign Application Priority Data

Jan. 30, 2022 (CN) ........................ 202210114150.X

(51) Int. Cl.
*G06T 5/60* (2024.01)
*G06T 5/50* (2006.01)
(Continued)

(52) U.S. Cl.
CPC ................. *G06T 5/60* (2024.01); *G06T 5/50* (2013.01); *G06T 5/77* (2024.01); *G06T 7/90* (2017.01);
(Continued)

(58) Field of Classification Search
CPC ... G06V 5/60; G06V 7/90; G06V 5/77; G06V 5/50
See application file for complete search history.

(56) References Cited

U.S. PATENT DOCUMENTS

| | | | |
|---|---|---|---|
| 11,055,514 B1 | 7/2021 | Cao et al. | |
| 11,055,762 B2 * | 7/2021 | Sherman | G06Q 30/0631 |
| 2018/0276869 A1 * | 9/2018 | Matts | G06Q 30/0271 |

FOREIGN PATENT DOCUMENTS

| | | |
|---|---|---|
| CN | 107909095 A | 4/2018 |
| CN | 111429536 A | 7/2020 |

(Continued)

OTHER PUBLICATIONS

International Search Report for PCT/CN2023/072098, mailed May 23, 2023, 7 pages.

*Primary Examiner* — Chan S Park
(74) *Attorney, Agent, or Firm* — Astute IP Law Group

(57) ABSTRACT

The disclosure provides a method and apparatus for processing an image, an electronic device, and a storage medium. The image processing method includes: obtaining an image to be processed, where the image to be processed includes a face region, and a skin state of the face region in the image to be processed is at a first skin age; and inputting the image to be processed into a pre-trained target skin image processing model, and obtaining a target effect image corresponding to the image to be processed, where the target skin image processing model is obtained by training an initial skin image processing model according to a sample original image and a sample effect image corresponding to the sample original image, a skin state of a face region in the target effect image is at a second skin age, and the second skin age is less than or equal to the first skin age.

17 Claims, 4 Drawing Sheets

(51) Int. Cl.
*G06T 5/77* (2024.01)
*G06T 7/90* (2017.01)

(52) U.S. Cl.
CPC ............... *G06T 2207/10024* (2013.01); *G06T 2207/20081* (2013.01); *G06T 2207/20084* (2013.01); *G06T 2207/30201* (2013.01)

(56) References Cited

FOREIGN PATENT DOCUMENTS

| | | | |
|---|---|---|---|
| CN | 111553854 | A | 8/2020 |
| CN | 113177891 | A | 7/2021 |
| CN | 113255396 | A | 8/2021 |
| CN | 114445302 | A | 5/2022 |

* cited by examiner

GAME INTERACTION CONTROL METHOD AND APPARATUS, STORAGE MEDIUM AND ELECTRONIC DEVICE

CROSS-REFERENCE TO RELATED APPLICATION(S)

The present application is a U.S. National Stage Application of PCT Application Serial No. PCT/CN2023/072098, filed Jan. 13, 2023, which claims the right of priority to Chinese patent application No. 202210114150.X, filed with the Chinese Patent Office on Jan. 30, 2022, which are incorporated in their entireties herein by reference.

FIELD

The disclosure relates to the technical field of image processing, and relates to, for example, a method and apparatus for processing an image, an electronic device, and a storage medium.

BACKGROUND

Based on the portrait beautification related technology, a skin state can be artificially adjusted to become tighter and plumper.

A skin state can be changed by processing a number of face regions of a user one by one, but in this case, the operation is complicated, the interaction is cumbersome, and the user experience is poor. The skin state of the user can also be adjusted in a way like "one-click beautify", but in this case, parameters are fixed. In consequence, serious homogenization of processing results will be caused, and a large amount of detailed information is lost, resulting in poor image quality and affecting the user experience.

SUMMARY

The disclosure provides a method and apparatus for processing an image, an electronic device, and a storage medium, so as to simplify an image processing flow and improve adaptability of image processing and naturalness of an image processing result.

In a first aspect, the disclosure provides an image processing method. The method includes:

obtaining an image to be processed, where the image to be processed includes a face region, and a skin state of the face region in the image to be processed is at a first skin age; and inputting the image to be processed into a pre-trained pre-trained target skin image processing model, and obtaining a target effect image corresponding to the image to be processed, where the target skin image processing model is obtained by training an initial skin image processing model according to a sample original image and a sample effect image corresponding to the sample original image, a skin state of a face region in the target effect image is at a second skin age, and the second skin age is less than or equal to the first skin age.

In a second aspect, the disclosure further provides an apparatus for processing an image. The apparatus includes:

an image obtaining module configured to obtain an image to be processed, where the image to be processed includes a face region, and a skin state of the face region in the image to be processed is at a first skin age; and a skin processing module configured to input the image to be processed into a pre-trained target skin image processing model, and obtain a target effect image corresponding to the image to be processed, where the target skin image processing model is obtained by training an initial skin image processing model according to a sample original image and a sample effect image corresponding to the sample original image, a skin state of a face region in the target effect image is at a second skin age, and the second skin age is less than or equal to the first skin age.

In a third aspect, the disclosure further provides an electronic device. The electronic device includes:

one or more processors; and a storage apparatus configured to store one or more programs, wherein when the one or more programs are executed by the one or more processors, the one or more processors are caused to implement the image processing method according to the disclosure.

In a fourth aspect, the disclosure further provides a computer-readable storage medium, storing a computer program. The computer program implements the image processing method according to the disclosure when executed by a processor.

In a fifth aspect, the disclosure further provides a computer program product, including a computer program carried on a non-transitory computer-readable medium. The computer program includes a program code for executing the image processing method according to the disclosure.

DETAILED DESCRIPTION OF EMBODIMENTS

Figure 1:
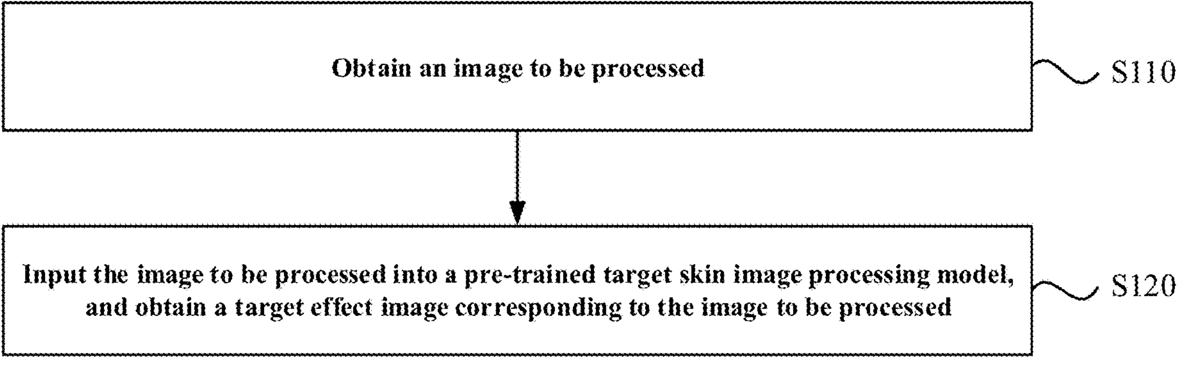
FIG. 1 is a schematic flowchart of an image processing method according to Example 1 of the disclosure.

Examples of the disclosure are described below with reference to the drawings. Although some examples of the disclosure are shown in the drawings, the disclosure may be embodied in various forms. These examples are provided, such that the disclosure will be understood. The drawings and examples of the disclosure are for illustrative purposes merely.

Various steps recited in the method embodiments of the disclosure can be performed in different orders and/or in parallel. Furthermore, the method embodiments can include additional steps and/or omit to execute the illustrated steps. The scope of the disclosure is not limited in this respect.

As used herein, the term "comprise" or "include" and their variations are open-ended, that is, "comprise but not limited to" and "include but not limited to". The term "based on" is "based at least in part on". The term "an example" means "at least one example". The term "another example" means "at least one further example". The term "some examples" means "at least some examples". Definitions for other terms are given in the description below.

Concepts such as "first" and "second" mentioned in the disclosure are merely used to distinguish different apparatuses, modules or units, and are not used to limit the order of functions executed by these apparatuses, modules or units or their interdependence. The modification with "a", "an" or "a plurality of" in the disclosure is intended to be illustrative rather than limitative, and should be understood by those skilled in the art as "one or more" unless the context dictates otherwise.

The terms "first", "second" and so forth, in the description and claims of the disclosure and in the above-mentioned drawings, are used to distinguish between similar objects and not necessarily to describe a particular order or sequential order. The data used in this way may be interchanged where appropriate, such that the examples of the disclosure described herein can be implemented in other sequences than those illustrated or described herein. Moreover, the terms "comprise", "include", "have", and any variations thereof are intended to cover non-exclusive inclusions, for example, processes, methods, systems, products, or equipment that includes a series of steps or units are not necessarily limited to those explicitly listed steps or units, but may include other steps or units not listed or inherent to these processes, methods, products, or devices.

The names of messages or information exchanged between a plurality of apparatuses in the embodiments of the disclosure are merely for illustrative purposes, and are not intended to limit the scope of these messages or information.

Example 1

FIG. 1 is a schematic flowchart of an image processing method according to Example 1 of the disclosure. The example may be applicable to a case of adjusting a skin state of a face region of a user. The method may be executed by an apparatus for processing an image, implemented by software and/or hardware, and configured in a terminal and/or a server to implement the image processing method in the example of the disclosure.

As shown in FIG. 1, the method in the example may include:

S110. Obtain an image to be processed.

The image to be processed includes a face region. A skin state of the face region in the image to be processed is at a first skin age. The image to be processed may be an image to be subjected to subsequent skin rejuvenation processing. The image to be processed may be an image including a face region captured by a camera apparatus, or may be an uploaded image including a face region.

The skin age may be the age of skin, and may be determined, for example, based on a plurality of numerical values such as wrinkles, pores, stains, elasticity, smoothness, and hydration of the skin, that is, determined based on a skin state of a face. The skin age and a true age can be the same or not. Generally, a skin age corresponding to each true age is an average skin type corresponding to a common population in an age group in which the true age is located. However, there are also cases where the skin age does not match the actual age. The true age is calculated from a date of birth.

In the example of the disclosure, the first skin age may be information configured to describe a skin state of a face region in the image to be processed.

An image including a face region may be captured based on a capturing function of the apparatus. The captured image may be taken as the image to be processed. An image including a face region may also be uploaded based on an image upload function. The uploaded image may be taken as the image to be processed.

Based on the technical solution of the example of the disclosure, the image to be processed may be obtained through the following method:

Step 1. Display at least one image obtaining control when a special effect trigger operation for enabling a preset skin processing special effect is received.

The preset skin processing special effect may be a special effect related to skin state adjustment on the face region, for example, a special effect for reducing the skin age, or various special effect for skin processing. As long as these special effects include skin rejuvenation processing on the face region, these special effects may be determined as preset skin processing special effects. The special effect trigger operation may be a click on a control associated with special effect triggering, may also be a trigger operation of a voice trigger, an action trigger, a gesture trigger, etc. The image obtaining control may be a control corresponding to different image obtaining modes. The image obtaining control may be a virtual identifier set on an application software interface. The image obtaining control may have various forms of expression, for example, buttons or icons.

When the user wants to use a special effect for processing, the user can execute the trigger operation for triggering the preset skin processing special effect. When the special effect trigger operation for enabling the preset skin processing special effect is received, at least one image obtaining control may be presented, such that the user may determine an image subjected to the preset skin processing special effect subsequently by triggering the image obtaining control.

Step 2. Receive a control trigger operation for the at least one image obtaining control, and obtain the image to be processed in an image obtaining mode corresponding to a triggered image obtaining control.

When the control trigger operation for at least one image obtaining control is received, an image obtaining mode corresponding to the control trigger operation is determined, and an image to be processed is obtained according to the determined image obtaining mode.

Illustratively, in a case that the triggered image obtaining control is "take photos and upload", it may be determined that the image obtaining mode is to capture an image through a capturing function. Therefore, the capturing function may be started to obtain the image to be processed. In a case that the triggered image obtaining control is "local upload", it may be determined that the image obtaining mode is to upload a local picture. Therefore, an album may be opened to allow the user to select a picture from the album to upload.

S120. Input the image to be processed into a pre-trained target skin image processing model, and obtain a target effect image corresponding to the image to be processed.

The target skin image processing model may be a model for performing skin image processing on the image to be processed. The target skin image processing model is obtained by training an initial skin image processing model according to a sample original image and a sample effect image corresponding to the sample original image, a skin state of a face region in the target effect image is at a second skin age, and the second skin age is less than or equal to the first skin age. The second skin age may be information configured to describe the skin state of the face region in the target effect image.

The sample original image may be an unprocessed face image. The sample effect image may be a face image subjected to skin image processing, for example, a face image subjected to skin lifting. The initial skin image processing model may be a model whose model parameters are default parameters, and serve as a basic model for subsequent model training.

The target effect image is an image obtained by processing the image to be processed through the target skin image processing model, that is, the image, subjected to skin image processing, corresponding to the image to be processed. The sample effect image may be an image obtained by performing various processing on the sample original image through image processing software (for example, PhotoShop, etc.).

For example, the processing may be skin rejuvenation processing such as removing dark circles, removing nasolabial folds, removing wrinkles, and filling depressions. The sample original image and the sample effect image may also be images in image sets before and after skin image processing. The image before skin lifting is determined as the sample original image, and the image after skin image processing is determined as the sample effect image. The initial skin image processing model may be a neural network model, a generative adversarial network model, etc.

The image to be processed is input into the target skin image processing model obtained by training in advance, the image to be processed is processed through the target skin image processing model, and the processed image is taken as a target effect image, that is, the image to be processed after skin image processing is obtained.

Based on the technical solution of the example of the disclosure, the target effect image may be displayed in a preset display region. The target effect image can be displayed in many ways, which are not limited herein. For example, the target effect image may be statically or dynamically displayed, and other displayed effects may also be superimposed on the target effect image for display.

The preset display region may be an entire display region or a partial display region of the entire display region. When the preset display region is the partial display region, a display mode of the target effect image may be to display the image to be processed and the target effect image in different regions in the display region, so as to view a difference between the image to be processed and the target effect image and intuitively understand an effect of the image to be processed after processing.

After the target effect image is obtained, the target effect image may be pushed to the user, such that the user can intuitively see the image after skin image processing. In order to make the user know the difference between before and after skin image processing through comparison, the target effect image may be displayed in the preset display region when the image to be processed is displayed.

A skin age corresponding to the target effect image is less than or equal to a skin age corresponding to the image to be processed. Since the skin age of the user may not match the real age, in this case, the skin age corresponding to the target effect image may be still greater than the real age, or not much different from the real age. Illustratively, a real age of a user A is 20 years old, and a skin age of an image to be processed of the user A is 40 years old, such that a skin age of a target effect image is less than or equal to 40 years old, but may still be greater than 20 years old, or may be less than or equal to 20 years old. A real age of a user B is 60 years old, and a skin age of an image to be processed of the user B is 40 years old, such that a skin age of a target effect image is less than or equal to 40 years old, and may be much less than 60 years old. The skin age corresponding to the target effect image is still determined according to an image processing situation.

According to the technical solution of the example of the disclosure, the image to be processed is obtained, the image to be processed is input into the pre-trained target skin image processing model, and the target effect image corresponding to the image to be processed is obtained. The problems of serious homogenization, serious detail loss and low resolution during face beautification for a user are solved, an image processing flow is simplified, and adaptability of image processing and naturalness of an image processing result are improved.

Example 2

Figure 2:
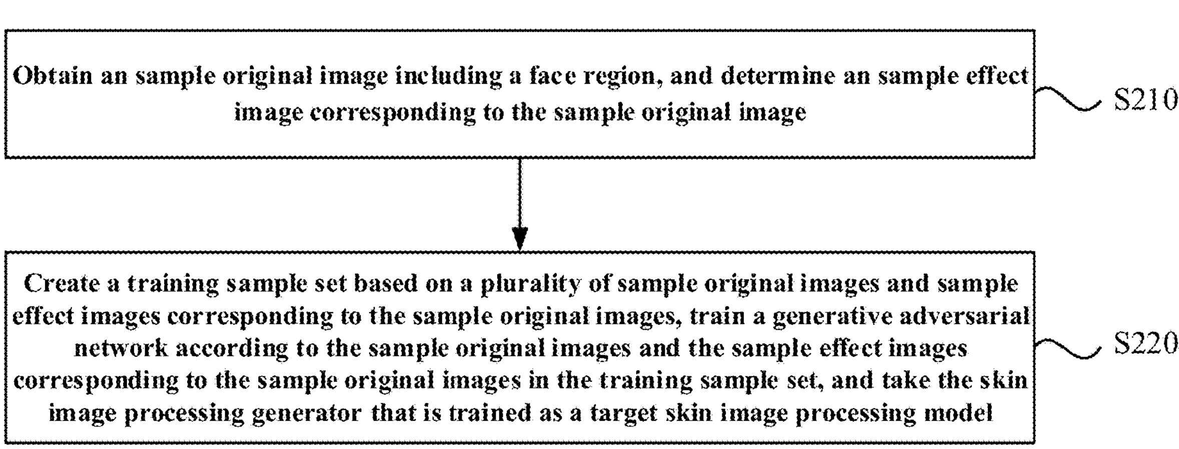
FIG. 2 is a schematic flowchart of a method for training a target skin image processing model according to Example 2 of the disclosure.

FIG. 2 is a schematic flowchart of a method for training a target skin image processing model according to Example 2 of the disclosure. The example is described on the basis of any technical solution of the example of the disclosure, and reference may be made for a method for training a target skin image processing model to the technical solution of the example. Explanation of terms identical or corresponding to those of the above example is not repeated herein.

As shown in FIG. 2, the method in the example may include:

S210. Obtain a sample original image including a face region, and determine a sample effect image corresponding to the sample original image.

The sample original image may be an unprocessed face image. The sample effect image may be a face image subjected to skin image processing. A skin state of the face region in the sample original image is at the first skin age, a skin state of a face region in the sample effect image is at the second skin age, and the second skin age is less than or equal to the first skin age.

A certain number of sample original images including the face region may be obtained by photographing, downloading, uploading, etc. Accordingly, each sample original image can be processed step by step, and is mainly subjected to skin rejuvenation processing. The processed image is determined as a sample effect image corresponding to the sample original image, such that the skin in the sample effect image is younger than that in the sample original image.

Based on the technical solution of the example of the disclosure, the sample effect image corresponding to the sample original image may be determined through the following method:

Obtain a preliminary effect image obtained by performing skin age conversion on the face region in the sample original image, and determine the sample effect image according to the preliminary effect image.

The skin age conversion includes at least one of wrinkle fading, dark circle fading, and depression filling. The skin age conversion corresponds to the skin image processing performed by the subsequent pre-trained target skin image processing model. The preliminary effect image may be an image obtained by performing skin age conversion on the sample original image, that is, an image subjected to skin rejuvenation processing.

Skin age conversion is performed on the face region in each sample original image, to make the face region in the sample original image younger and have a smaller skin age. The image subjected to skin age conversion is determined as the preliminary effect image. Accordingly, the preliminary effect image may be taken as the sample effect image, or the preliminary effect image may be subjected to adjustment to obtain the sample effect image. The adjustment may be brightness adjustment, saturation adjustment, color adjustment, definition adjustment, etc.

Based on the technical solution of the example of the disclosure, the sample effect image may be determined according to the preliminary effect image through the following method:

Perform skin color correction on a face region in the preliminary effect image according to the sample original image, and obtain the sample effect image.

The skin color correction may be a processing method for adjusting a color of the skin region in the preliminary effect image so as to make the color of the skin region close to that of the sample original image.

A skin color of the face region in the preliminary effect image is adjusted with a reference to a skin color of the face region in the sample original image, such that the skin color of the face region in the preliminary effect image is closer to the reference, so as to improve authenticity of image processing.

Based on the technical solution of the example of the disclosure, skin color correction may be performed on the face region in the preliminary effect image according to the sample original image, and the sample effect image may be obtained through the following method:

Step 1, calculate a first skin color mean value of the face region in the sample original image and a second skin color mean value of the face region in the preliminary effect image.

The first skin color mean value may be a mean value of color values of a plurality of pixel points corresponding to the face region in the sample original image. The second skin color mean value may be a mean value of color values of a plurality of pixel points corresponding to the face region in the preliminary effect image.

According to the color values of the plurality of pixel points corresponding to the face region in the sample original image, the mean value of the plurality of color values is calculated to obtain the first skin color mean value. According to the color values of the plurality of pixel points corresponding to the face region in the preliminary effect image, the mean value of the plurality of color values is calculated to obtain the second skin color mean value.

The first skin color mean value of the face region in the sample original image may be calculated through the following method:

Determine the face region in the sample original image, determine a skin region in the face region, and calculate the first skin color mean value of a plurality of pixel points of the skin region.

The skin region may be a remaining region excluding a non-skin region such as an eyebrow region, an eye region, and a lip region in the face region.

The face region is identified from the sample original image, the skin region is determined from the face region, and then superposition of the color values of the plurality of pixel points in the skin region is averaged to obtain the first skin color mean value.

A method for determining the second skin color mean value is similar to that described above, which is not repeated herein.

Step 2. Determine target color values corresponding to a plurality of pixel points of the face region in the preliminary effect image according to the first skin color mean value, the second skin color mean value, and original color values corresponding to the plurality of pixel points of the face region in the preliminary effect image separately, and generate the sample effect image according to the target color values.

The original color value may be a color value corresponding to each pixel point of the face region in the preliminary effect image. The target color value may be a color value to which each pixel point of the face region in the preliminary effect image is to be adjusted.

A color difference between the sample original image and the preliminary effect image may be determined according to the first skin color mean value and the second skin color mean value. Accordingly, the original color value corresponding to each pixel point of the face region in the preliminary effect image is processed according to the color difference between the sample original image and the preliminary effect image, and a target color value corresponding to each pixel point is determined. A sample effect image is generated according to the target color value corresponding to each pixel point, such that the preliminary effect image is adjusted to a sample effect image with a skin color matching the skin color of the sample original image.

Illustratively, the original color value corresponding to each pixel point of the face region in the preliminary effect image may be subtracted from the second skin color mean value, and a de-mean color value corresponding to each pixel point is obtained. Further, the de-mean color value corresponding to each pixel point is added to the first skin color mean value, and the target color value corresponding to each pixel point is obtained. In this way, the skin color mean value can be adjusted to make the image more realistic.

S220. Create a training sample set based on a plurality of sample original images and sample effect images corresponding to the sample original images, train the generative adversarial network according to the sample original images and the sample effect images corresponding to the sample original images in the training sample set, and take the skin image processing generator that is trained as the target skin image processing model.

The initial skin image processing model includes a generative adversarial network, and the generative adversarial network includes a skin image processing generator and a skin image processing discriminator. The skin image processing generator may be a fully-connected neural network, a deconvolution network, etc. The skin image processing discriminator may be any discriminator model, such as a fully-connected network, a network including convolution, etc. The training sample set may be an image set composed of a plurality of sample original images and sample effect images corresponding to each sample original image, and is configured for subsequent training to obtain the target skin image processing model.

The plurality of sample original images and the sample effect images corresponding to the sample original images are combined to obtain the training sample set. The step of training the generative adversarial network according to the sample original images and the sample effect images corresponding to the sample original images in the training sample set may be training the skin image processing generator and the skin image processing discriminator, and then the skin image processing generator that is trained is taken as the target skin image processing model.

Due to different ages of the sample original images in the training sample set, significances of the sample effect images obtained by subsequent processing are different. When the numbers of samples at a plurality of ages are different, there is a problem of sample imbalance, which leads to a poor training effect on the generative adversarial network. Therefore, the number of samples at different ages can be balanced. Based on the technical solution of the example of the disclosure, the generative adversarial network is trained through the following method:

Determine a target iteration training number of the sample original images according to skin ages corresponding to the sample original images in the training sample set and a number of sample original images corresponding to each skin age, and train the generative adversarial network according to the sample original images, the sample effect images corresponding to the sample original images, and the target iteration training number.

The skin age may be an age corresponding to a skin state of a face region of a person corresponding to the face region in the sample original image, and not a true age. Illustratively, in a case that the skin age cannot be determined according to image processing analysis, but can only be determined to a certain range, the range can be regarded as the skin age. The target iteration training number may be the number of times of training the generative adversarial network according to the sample original images.

The skin age corresponding to each sample original image in the training sample set is determined, and the number of the sample original image corresponding to each skin age is determined. In order to balance the number of the sample original images corresponding to the plurality of skin ages, a target iteration training number corresponding to each sample original image corresponding to each skin age may be determined. Accordingly, each sample original image is input into the generative adversarial network for training according to the target iteration training number corresponding to the sample original image.

Illustratively, the number of sample original images corresponding to a skin age A is 300, and the number of sample original images corresponding to a skin age B is 600. Then, the target iterative training number of each sample original image corresponding to the skin age A may be determined to be 2, and the target iterative training number of each sample original image corresponding to the skin age B may still be 1. Alternatively, the target iterative training number of 150 random sample original images corresponding to the skin age A may be determined to be 3, the target iterative training number of the remaining 150 sample original images may be determined to be 1, and the target iterative training number of each sample original image corresponding to the skin age B may be kept to be 1. Alternatively, the target iterative training number of one sample original image corresponding to the skin age A may be determined to be 301, the target iterative training number of the remaining 299 sample original images may be determined to be 1, and the target iterative training number of each sample original image corresponding to the skin age B may be kept to be 1.

Based on the technical solution of the example of the disclosure, grouping may be performed according to the skin ages, to improve sample balance efficiency. A method for grouping may include:

group the plurality of sample original images in the training sample set according to the skin age corresponding to each sample original image in the training sample set, obtain sample training groups of at least two age groups, and determine a target iteration training number corresponding to each sample training group according to an number of sample original images corresponding to each sample training group.

A target iteration training number of a sample training group with fewer images is not lower than a target iteration training number of a sample training group with more images.

The skin age corresponding to each sample original image in the training sample set is determined, and the plurality of sample original images are grouped into sample training groups corresponding to at least two age groups according to preset grouping requirements. Accordingly, according to the number of the sample original images corresponding to each sample training group, the target iteration training number of the sample training group with less sample original images is increased, such that the plurality of sample training groups are balanced.

Illustratively, skin ages 21-40 are taken as a first age group, and a sample training group corresponding to the first age group is determined as a first sample training group. Skin ages 41-60 are taken as a second age group, and a sample training group corresponding to the second age group is determined as a second sample training group. Skin ages 61-80 are taken as a third age group, and a sample training group corresponding to the third age group is determined as a third sample training group. The number of the sample original images corresponding to the first sample training group is 400, the number of the sample original images corresponding to the second sample training group is 200, and the number of the sample original images corresponding to the third sample training group is 100. Accordingly, it can be determined that a target iteration training number of the second sample training group is 2, and a target iteration training number of the third sample training group is 4. In a case that the number of images of the sample training group with more images is not an integer multiple of the number of images of the sample training group with less images, the target iteration training numbers corresponding to different sample original images of the sample training group with less images may be determined separately, that is, the target iteration training numbers corresponding to different sample original images in the same sample training group may be the same or not.

According to the technical solution of the example, the sample original image including a face region is obtained to determine the sample effect image corresponding to the sample original image. The training sample set is created based on a plurality of sample original images and sample effect images corresponding to the sample original images, the generative adversarial network is trained according to the sample original images and the sample effect images corresponding to the sample original images in the training sample set, and the skin image processing generator that is trained is taken as the target skin image processing model. The problem that a beautification effect is poor and naturalness of a beautified image is poor when a face of a user is beautified by the model is solved, and the effect of improving both the beautification effect and the naturalness of the beautified image through the generative adversarial network is achieved.

Example 3

Figure 3:
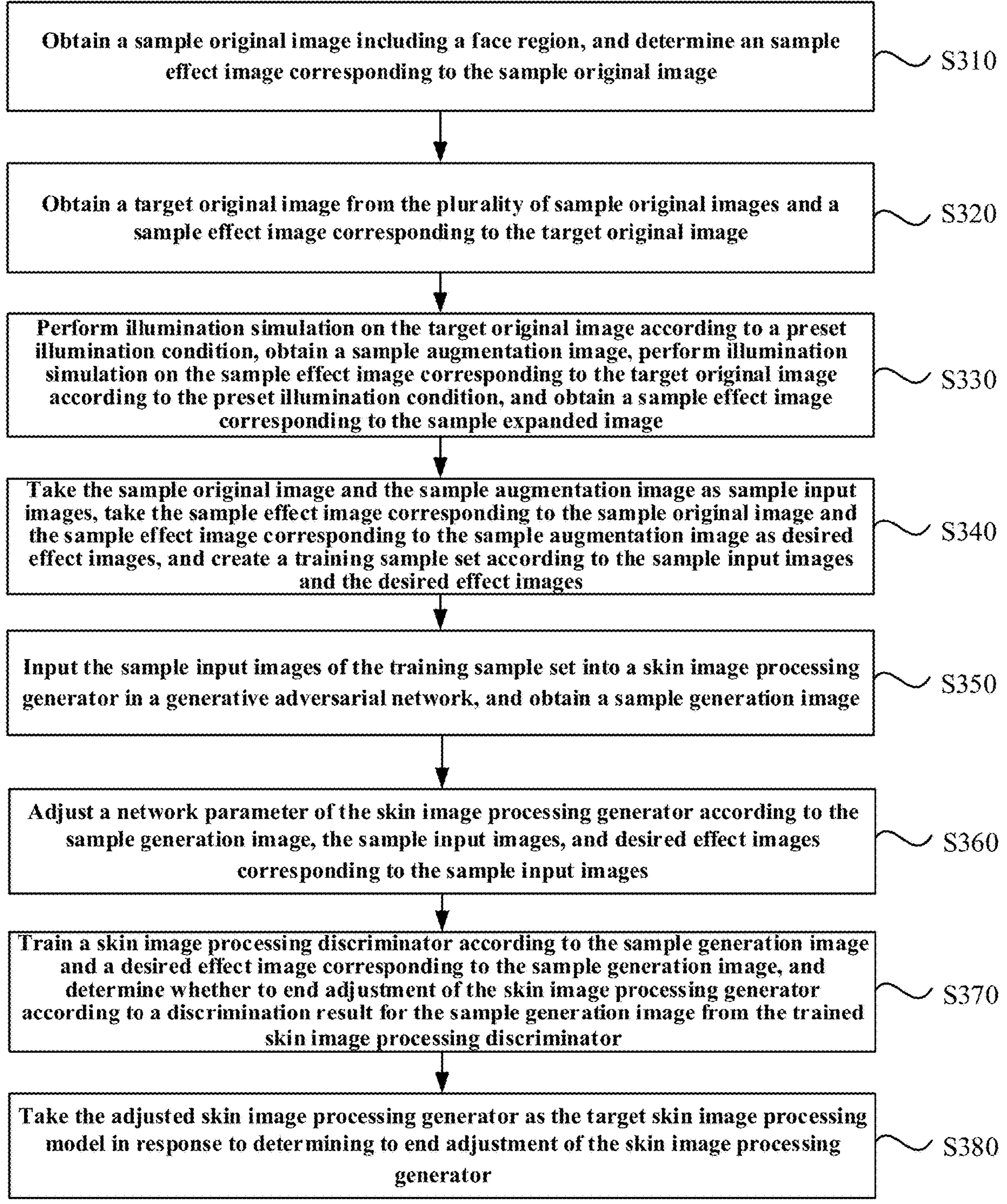
FIG. 3 is a schematic flowchart of a method for training a target skin image processing model according to Example 3 of the disclosure.

FIG. 3 is a schematic flowchart of a method for training a target skin image processing model according to Example 3 of the disclosure. The example is described on the basis of any technical solution of the example of the disclosure, and reference may be made for sample expansion of a training sample set, training processes of the skin image processing generator and a skin image processing discriminator to the technical solution of the example. Explanation of terms identical or corresponding to those of the above example is not repeated herein.

As shown in FIG. 3, the method in the example may include:

S310. Obtain a sample original image including a face region, and determine an sample effect image corresponding to the sample original image.

S320. Obtain a target original image from the plurality of sample original images and a sample effect image corresponding to the target original image.

The target original images may be all or some of the sample original images, and are configured for subsequent expansion of the training sample set.

The target original images are selected from the plurality of sample original images, and the sample effect image corresponding to each target original image is determined for subsequent processing and matching.

S330. Perform illumination simulation on the target original image according to a preset illumination condition, obtain a sample augmentation image, perform illumination simulation on the sample effect image corresponding to the target original image according to the preset illumination condition, and obtain a sample effect image corresponding to the sample augmentation image.

The preset illumination condition may be an illumination condition configured to change an illumination condition of the target original image, and may include an illumination position, illumination intensity, an illumination color, a light source form, etc. The illumination simulation may be a processing manner in which light under the preset illumination condition is superimposed on the target original image. The sample augmentation image may be an image subjected to illumination simulation, and is configured for sample expansion of the sample original image.

One or more preset illumination conditions may be determined, illumination simulation may be performed on the target original image according to the one or more preset illumination conditions, and the processed image may be taken as a sample augmentation image. Correspondingly, illumination simulation is performed on the sample effect image corresponding to the target original image according to the one or more preset illumination conditions, and the processed image is taken as a sample effect image corresponding to each sample augmentation image.

The reason why the target original image and the sample effect image corresponding to the target original image are subjected to the same illumination simulation is to guarantee that only skin image processing is performed on the sample augmentation image and the sample effect image corresponding to the sample augmentation image, such that an influence of the illumination conditions is avoided.

S340. Take the sample original image and the sample augmentation image as sample input images, take the sample effect image corresponding to the sample original image and the sample effect image corresponding to the sample augmentation image as desired effect images, and create a training sample set according to the sample input images and the desired effect images.

The sample input images are images before skin image processing in the training sample set, and the desired effect image is an image obtained after skin image processing in the training sample set.

The sample original image and the sample effect image corresponding to the sample original image are an original part in the training sample set, and the sample augmentation image and the sample effect image corresponding to the sample augmentation image are augmented parts in the training sample set. The sample original image and the sample augmentation image are taken as sample input images, that is, images before skin image processing. The sample effect image corresponding to the sample original image and the sample effect image corresponding to the sample augmentation image are taken as desired effect images, that is, images after skin image processing. Accordingly, a training sample set is created by associating the sample input images with the desired effect images.

S350. Input the sample input images of the training sample set into a skin image processing generator in a generative adversarial network, and obtain a sample generation image.

The sample input images of the training sample set are input into the skin image processing generator in the generative adversarial network. By means of processing of the skin image processing generator, the sample generation image corresponding to each sample input image is obtained.

S360. Adjust a network parameter of the skin image processing generator according to the sample generation image, the sample input images, and a desired effect images corresponding to the sample input images.

A difference between images before and after processing of the skin image processing generator can be determined from a difference between the sample generation image and the sample input images. A difference between an image after processing of the skin image processing generator and an image desired to be obtained can be determined from a difference between the sample generation image and the desired effect image corresponding to the sample input images. Accordingly, the network parameter of the skin image processing generator is adjusted according to the determined two differences, such that the subsequent sample generation image output by the skin image processing generator has a skin processing effect with respect to the sample input images and has an indistinguishable effect with respect to the desired effect image.

Based on the technical solution of the example of the disclosure, the network parameter of the skin image processing generator may be adjusted through the following method:

Step 1. Calculate a first loss value between the sample generation image and the sample input images according to a preset first loss function.

The preset first loss function may be a loss function configured to measure a difference between the sample generation image and the sample input images. The first loss value may be an output value calculated by the preset first loss function, and represents a difference between the sample generation image and the sample input images.

In order to guarantee authenticity of an effect of the skin image processing generator, it is guaranteed that an unprocessed part is as close to the sample input images as possible.

Therefore, regions of interest where processing is relatively obvious, such as an eye region, a nasolabial fold region, and the chin region may be excluded, and the first loss function is created based on the remaining regions other than the regions of interest, such that differences in the remaining region are not obvious.

Step 2. Calculate a second loss value between the sample generation image and the desired effect images corresponding to the sample input images according to a preset second loss function.

The preset second loss function may be a loss function configured to measure a difference between the sample generation image and the desired effect images corresponding to the sample input images. The second loss value may be an output value calculated by the preset second loss function, and represents the difference between the sample generation image and the desired effect images corresponding to the sample input images.

In order to guarantee effectiveness of the effect of the skin image processing generator, it is guaranteed that a processed part is as close to the desired effect image as possible. Therefore, the second loss function may be created according to the region of interest where the processing is obvious, such as the eye region, the nasolabial fold region, and a chin region, so as to reduce the difference between the sample generation image and the desired effect images corresponding to the sample input images.

Step 3. Adjust the network parameter of the skin image processing generator according to the first loss value and the second loss value.

After the first loss value and the second loss value are obtained, the network parameter of the skin image processing generator may be adjusted according to the first loss value and the second loss value separately, such that a comprehensive loss value of the first loss value and the second loss value calculated after adjustment decreases. The comprehensive loss value may be calculated according to the first loss value and the second loss value, and a calculation method may be summation calculation, weighted summation calculation, etc.

S370, train a skin image processing discriminator according to the sample generation image and a desired effect image corresponding to the sample generation image, and determine whether to end adjustment of the skin image processing generator according to a discrimination result for the sample generation image from the trained skin image processing discriminator.

The skin image processing discriminator is trained according to the sample generation image and a desired effect image corresponding to the sample generation image, such that the skin image processing discriminator can more effectively discriminate between the sample generation image and the desired effect image corresponding to the sample generation image. It can be determined whether the sample generation image and the desired effect image corresponding to the sample generation image can be distinguished according to a discrimination result for the sample generation image from the trained skin image processing discriminator. If yes, it indicates that the effect of the sample generation image is poor, the parameter of the skin image processing generator need to be readjusted, and the adjustment of the skin image processing generator cannot be ended. If it is difficult to distinguish the images, it indicates that the effect of the sample generation image is desirable and close to the desired effect image, and the adjustment of the skin image processing generator can be ended.

S380, take the adjusted skin image processing generator as the target skin image processing model in response to determining to end adjustment of the skin image processing generator.

In a case that it is determined that the adjustment of the skin image processing generator can be ended according to the result of discrimination for the sample generation image from the trained skin image processing discriminator, it indicates that the adjusted skin image processing generator has stable and natural effects and can effectively achieve skin rejuvenation, and the adjusted skin image processing generator can be taken as the target skin image processing model.

According to the technical solution of the example, the sample original image including a face region is obtained to determine an sample effect image corresponding to the sample original image. The target original image is obtained from the plurality of sample original images, and a sample effect image corresponding to the target original image is obtained. Illumination simulation is performed on the target original image according to a preset illumination condition, a sample augmentation image is obtained, illumination simulation is performed on the sample effect image corresponding to the target original image according to the preset illumination condition, and a sample effect image corresponding to the sample augmentation image is obtained. The sample original image and the sample augmentation image are taken as sample input images, the sample effect image corresponding to the sample original image and the sample effect image corresponding to the sample augmentation image are taken as desired effect images, and a training sample set is created according to the sample input images and the desired effect images. Therefore, the training sample set is augmentation reliably, and model training samples are increased, such that a subsequent model training effect is effectively improved. Accordingly, the sample input images of the training sample set are input into the skin image processing generator in the generative adversarial network, and the sample generation image is obtained. The network parameter of the skin image processing generator is adjusted according to the sample generation image, the sample input images, and desired effect images corresponding to the sample input images, such that a training process of the skin image processing generator achieves the purpose of balancing the beautification effect and a natural effect. The skin image processing discriminator is trained according to the sample generation image and a desired effect image corresponding to the sample generation image, and whether to end adjustment of the skin image processing generator is determined according to a discrimination result for the sample generation image from the trained skin image processing discriminator. If yes, the adjusted skin image processing generator is taken as the target skin image processing model. The problem that a model training effect is poor due to the small number of model training samples and the problem that the beautification effect and the natural effect are difficult to consider simultaneously are solved. Expansion of the training sample set is realized, and the beautification effect and the natural effect are comprehensively considered to improve a user experience degree.

Example 4

Figure 4:
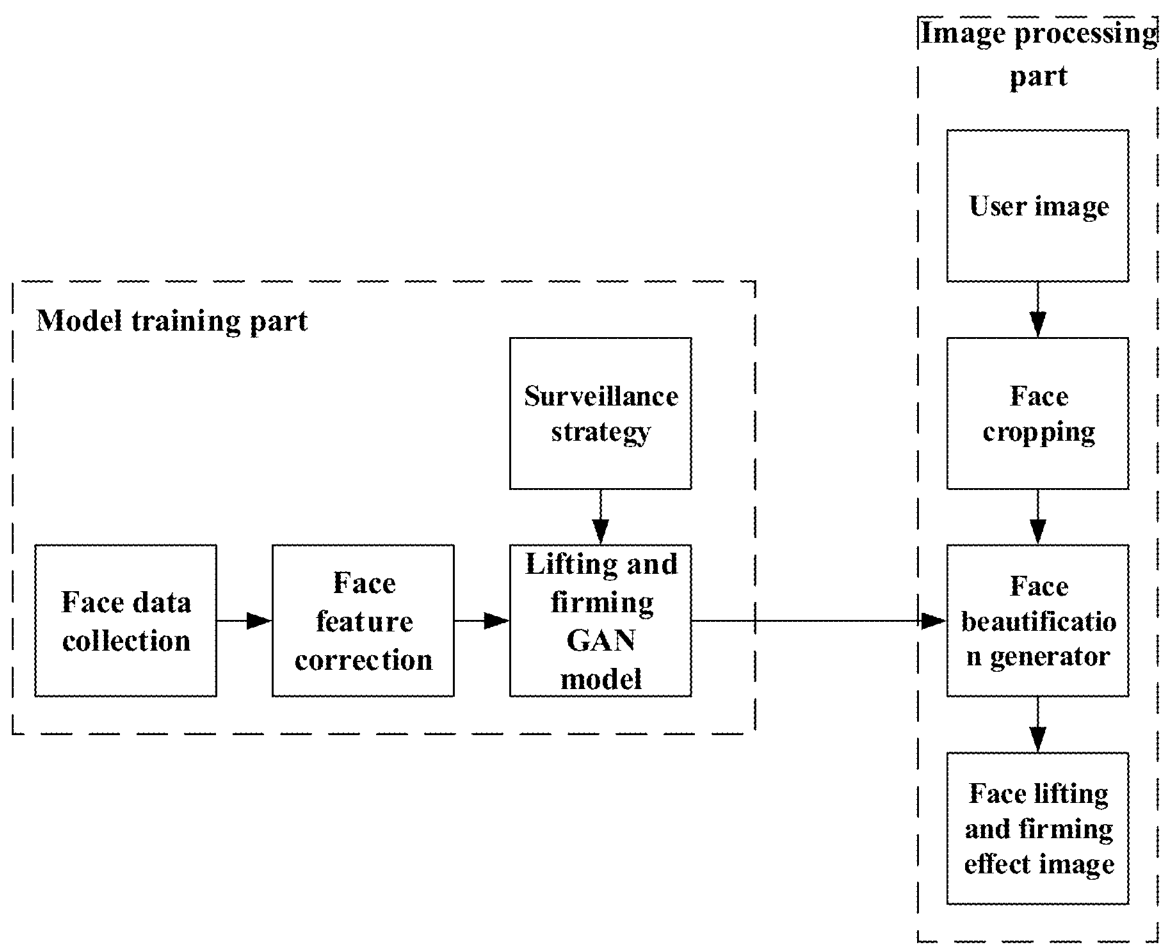
FIG. 4 is a schematic diagram of an image processing and model training method according to Example 4 of the disclosure.

FIG. 4 is a schematic diagram of an image processing and model training method according to Example 4 of the disclosure. As shown in FIG. 4, the method of the example may include a model training part and an image processing part.

The model training part mainly includes:

1. Face data collection is performed.

A certain amount of high-definition (HD) face data (sample original images) may be obtained by manual collection, for example: 500-2000 HD face images, and the number may be selected according to actual needs. In order to guarantee the effect of model training, it may be required that resolution of the face images is not lower than 1024*1024, and distribution of the face data is required to cover male and female, a plurality of skin age groups of 20-80 years as much as possible, and a plurality of angles of faces, etc.

2. Face feature correction is performed.

The face feature correction may be performed on the high-definition face images by manual processing, and a correction content is mainly related to face lifting and firming, such as removing dark circles, removing wrinkles, reducing nasolabial folds, filling face depressions, etc. A corrected face image (sample effect image) corresponding to each high-definition face image can be obtained by the face feature correction, and the high-definition face image may be denoted as A, and the corrected face image corresponding to each high-definition face image may be denoted as B.

3. A lifting and firming generative adversarial network (GAN) model is supervised trained to obtain a face beautification generator (target skin image processing model).

The lifting and firming model (generative adversarial network) is trained by using the certain number of high-definition face images A and the corrected face image B corresponding to each high-definition face image. In order to guarantee that the face beautification generator can adaptively learn parameters related to face lifting and firming in a training process, a supervision strategy needs to be specified. In a training process of the lifting and firming GAN model, illumination condition simulation (illumination simulation), age distribution adaptation (determining a target iteration training number of the sample original images according to skin ages corresponding to the sample original images in the training sample set and a number of sample original images corresponding to each skin age, and training the generative adversarial network according to the sample original images, the sample effect images corresponding to the sample original images, and the target iteration training number), skin color correction (skin color correction), facial high-dimensional semantic feature correction (calculating a first loss value between a sample generation image and a sample input image according to a preset first loss function), facial low-dimensional texture feature correction (calculating a second loss value between the sample generation image and a desired effect image corresponding to the sample input image according to a preset second loss function) and other image algorithm strategies are added, such that it is guaranteed that a lifting and firming GAN network can not only retain original skin information, but also only process blemish regions such as wrinkles, dark circles, skin depressions, etc. in a training process, and the complete face beautification generator is generated, which is marked as G (A, B).

The image processing part mainly includes:

1. A user images is received.

Illustratively, in an online application environment, the user image (image to be processed) determined by a user by photographing or uploading is received.

2. Face cropping is performed.

After the user uploads the user image, face cropping is performed by using face key point information. A method for face cropping is to recognize and crop a face region in the user image uploaded by the user, and to obtain a cropped face image. Moreover, the face image may be adjusted according to a model image, and a range of the face image may be augmented or compressed to a same range as the face image in the model image, such that subsequent recognition of a skin lifting and firming region is enhanced, and an image processing effect is improved.

3. Processing is performed based on the face beautification generator.

The cropped face image is input to the face beautification generator G (A, B) obtained in a model obtaining stage, face information is extracted from the face image by means of the face beautification generator G (A, B), and information such as face semantics and texture is processed.

4. A face lifting and firming effect image is output.

The face effect image with a lifting and firming effect is adaptively output in a preset display region.

According to the technical solution of the example, the face beautification generator is obtained through face data collection, face feature correction and supervised training of a lifting and firming GAN model. Moreover, the user image is received, face cropping is performed, processing is performed based on the face beautification generator, and a face lifting and firming effect image is output. Therefore, the problems of serious homogenization, serious detail loss and low resolution during face beautification for a user are solved, an image processing flow is simplified, and adaptability of image processing and naturalness of an image processing result are improved.

Example 5

Figure 5:
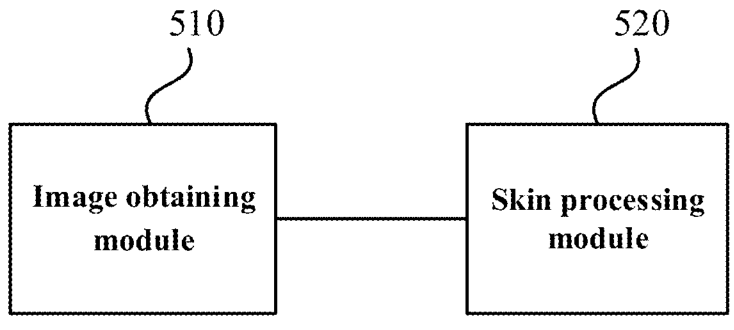
FIG. 5 is a schematic structural diagram of an apparatus for processing an image according to Example 5 of the disclosure.

FIG. 5 is a schematic structural diagram of an apparatus for processing an image according to Example 5 of the disclosure. The apparatus for processing an image provided in the example may be implemented by software and/or hardware, and configured in a terminal and/or a server to implement the image processing method in the example of the disclosure. As shown in FIG. 5, the apparatus may include:

an image obtaining module 510 configured to obtain an image to be processed, where the image to be processed includes a face region, and a skin state of the face region in the image to be processed is at a first skin age; and a skin processing module 520 configured to input the image to be processed into a pre-trained target skin image processing model, and obtain a target effect image corresponding to the image to be processed, where the target skin image processing model is obtained by training an initial skin image processing model according to a sample original image and a sample effect image corresponding to the sample original image, a skin state of a face region in the target effect image is at a second skin age, and the second skin age is less than or equal to the first skin age.

Based on any one of technical solutions of the example of the disclosure, the initial skin image processing model includes a generative adversarial network. The generative adversarial network includes a skin image processing generator and a skin image processing discriminator. The apparatus further includes: a model training module configured to obtain the sample original image including a face region, and determine the sample effect image corresponding to the sample original image, where a skin state of the face region in the sample original image is at the first skin age, and a skin state of a face region in the sample effect image is at the second skin age; and create a training sample set based on a plurality of sample original images and sample effect images corresponding to the sample original images, train the generative adversarial network according to the sample original images and the sample effect images corresponding to the sample original images in the training sample set, and take the skin image processing generator that is trained as the target skin image processing model.

Based on any one of technical solutions of the example of the disclosure, the model training module is further configured to obtain a preliminary effect image obtained by performing skin age conversion on the face region in the sample original image, and determine the sample effect image according to the preliminary effect image, where the skin age conversion includes at least one of wrinkle fading, dark circle fading, and depression filling.

Based on any one of technical solutions of the example of the disclosure, the model training module is further configured to perform skin color correction on a face region in the preliminary effect image according to the sample original image, and obtain the sample effect image.

Based on any one of technical solutions of the example of the disclosure, the model training module is further configured to calculate a first skin color mean value of the face region in the sample original image and a second skin color mean value of the face region in the preliminary effect image; and determine target color values corresponding to a plurality of pixel points of the face region in the preliminary effect image according to the first skin color mean value, the second skin color mean value, and original color values corresponding to the plurality of pixel points of the face region in the preliminary effect image separately, and generate the sample effect image according to the target color values.

Based on any one of technical solutions of the example of the disclosure, the model training module is further configured to determine the face region in the sample original image, determine a skin region in the face region, and calculate the first skin color mean value of a plurality of pixel points of the skin region.

Based on any one of technical solutions of the example of the disclosure, the model training module is further configured to obtain a target original image from the plurality of sample original images and a sample effect image corresponding to the target original image; perform illumination simulation on the target original image according to a preset illumination condition, obtain a sample augmentation image, perform illumination simulation the a sample effect image corresponding to the target original image according to the preset illumination condition, and obtain a sample effect image corresponding to the sample augmentation image; and take the sample original image and the sample augmentation image as sample input images, take the sample effect image corresponding to the sample original image and the sample effect image corresponding to the sample augmentation image as desired effect images, and create the training sample set according to the sample input images and the desired effect images.

Based on any one of technical solutions of the example of the disclosure, the model training module is further configured to input the sample input images of the training sample set into the skin image processing generator in the generative adversarial network, and obtain a sample generation image; adjust a network parameter of the skin image processing generator according to the sample generation image, the sample input images, and desired effect images corresponding to the sample input images; train the skin image processing discriminator according to the sample generation image and a desired effect image corresponding to the sample generation image, and determine whether to end adjustment of the skin image processing generator according to a discrimination result for the sample generation image from the trained skin image processing discriminator; and take the adjusted skin image processing generator as the target skin image processing model in response to determining to end adjustment of the skin image processing generator.

Based on any one of technical solutions of the example of the disclosure, the model training module is further configured to calculate a first loss value between the sample generation image and the sample input images according to a preset first loss function; calculate a second loss value between the sample generation image and the desired effect images corresponding to the sample input images according to a preset second loss function; and adjust the network parameter of the skin image processing generator according to the first loss value and the second loss value.

Based on any one of technical solutions of the example of the disclosure, the model training module is further configured to determine a target iteration training number of the sample original images according to skin ages corresponding to the sample original images in the training sample set and a number of sample original images corresponding to each skin age, and train the generative adversarial network according to the sample original images, the sample effect images corresponding to the sample original images, and the target iteration training number.

Based on any one of technical solutions of the example of the disclosure, the model training module is further configured to group the plurality of sample original images in the training sample set according to the skin age corresponding to each sample original image in the training sample set, obtain sample training groups of at least two age groups, and determine a target iteration training number corresponding to each sample training group according to a number of a sample original image corresponding to each sample training group. A target iteration training number of a sample training group with fewer images is not lower than a target iteration training number of a sample training group with more images.

Based on any one of technical solutions of the example of the disclosure, the image obtaining module 510 is further configured to display at least one image obtaining control when a special effect trigger operation for enabling a preset skin processing special effect is received; and receive a control trigger operation for the at least one image obtaining control, and obtain the image to be processed in an image obtaining mode corresponding to a triggered image obtaining control.

The apparatus can execute the methods provided in any example of the disclosure, and has corresponding functional modules and effects for executing the methods.

According to the technical solution of the example of the disclosure, the image to be processed is obtained, the image to be processed is input into the pre-trained target skin image processing model, and the target effect image corresponding to the image to be processed is obtained. The problems of serious homogenization, serious detail loss and low resolution during face beautification for a user are solved, an image processing flow is simplified, and adaptability of image processing and naturalness of an image processing result are improved.

The plurality of units and modules included in the apparatus are only divided according to functional logic, but are not limited to the above division, as long as corresponding functions can be implemented. Moreover, the names of the plurality of functional units are only used for distinguishing one another, and are not intended to limit the scope of protection of the examples of the disclosure.

Example 6

Figure 6:
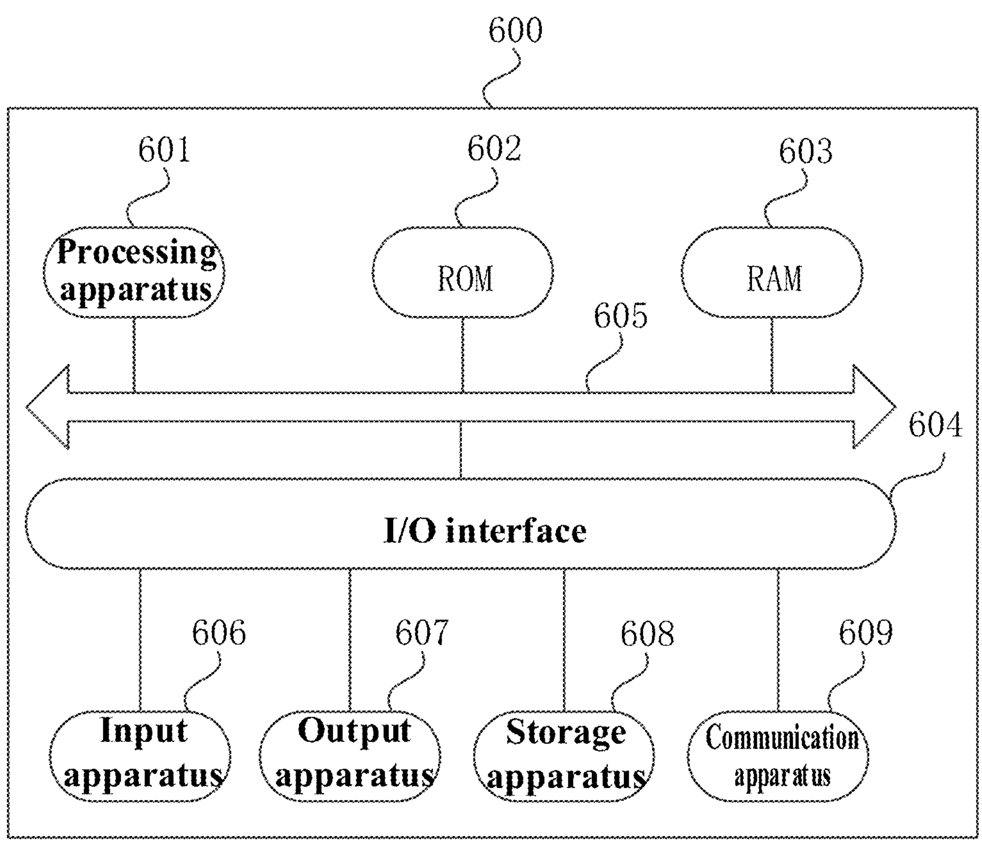
FIG. 6 is a schematic structural diagram of an electronic device according to Example 6 of the disclosure.

FIG. 6 is a schematic structural diagram of an electronic device according to Example 6 of the disclosure. With reference to FIG. 6 below, a schematic structural diagram of an electronic device (for example, a terminal device or a server in FIG. 6) 600 suitable for implementing an example of the disclosure is shown. The terminal device in the example of the disclosure may include, but is not limited to, a mobile terminal such as a mobile phone, a notebook computer, a digital broadcast receiver, a personal digital assistant (PDA), a portable android device (PAD), a portable media player (PMP), an in-vehicle terminal (for example, an in-vehicle navigation terminal), etc., and a fixed terminal such as a digital television (TV), a desktop computer, etc. The electronic device 600 illustrated in FIG. 6 is merely an instance and should not impose any limitation on the functions and scope of use of the examples of the disclosure.

As shown in FIG. 6, the electronic device 600 may include a processor (for example, a central processing unit, a graphics processing unit, etc.) 601 that may execute a plurality of appropriate actions and processes according to programs stored in a read-only memory (ROM) 602 or programs loaded from a storage apparatus 608 into a random-access memory (RAM) 603. The RAM 603 also stores a plurality of programs and data needed for the operations of the electronic device 600. The processor 601, the ROM 602, and the RAM 603 are connected to each other by means of a bus 605. An input/output (I/O) interface 604 is also connected to the bus 605.

Typically, the following apparatuses may be connected to the I/O interface 604: an input apparatus 606 including, for example, a touch screen, a touch pad, a keyboard, a mouse, a camera, a microphone, an accelerometer, a gyroscope, etc.; an output apparatus 607 including, for example, a liquid crystal display (LCD), a speaker, a vibrator, etc.; a storage apparatus 608 including, for example, a magnetic tape, a hard disk, etc.; and a communication apparatus 609. The communication apparatus 609 may allow the electronic device 600 to be in wireless or wired communication with other devices to exchange data. While the FIG. 6 illustrates an electronic device 600 having a plurality of apparatuses, not all of the illustrated apparatuses are required to be implemented or provided. More or fewer apparatus may alternatively be implemented or provided.

According to examples of the disclosure, a processes described above with reference to the flowcharts may be implemented as a computer software program. For example, examples of the disclosure include a computer program product. The computer program product includes a computer program carried on a non-transitory computer-readable medium, and the computer program includes a program code for executing the method illustrated in the flowchart. In such examples, the computer program may be downloaded and installed from a network by means of the communication apparatuses 609, or installed from the storage device 608, or installed from the ROM 602. When executed by the processor 601, the computer program executes the above-described functions defined in the method of the example of the disclosure.

The names of messages or information exchanged between a plurality of apparatuses in the embodiments of the disclosure are merely for illustrative purposes, and are not intended to limit the scope of these messages or information.

The electronic device provided in the example of the disclosure belongs to the same concept as the image processing method provided in the above examples, reference may be made to the above examples for technical details not described in detail in the example, and the example has the same effect as the above examples.

Example 7

The example of the disclosure provides a computer storage medium, storing a computer program. When executed by a processor, the program implements the above image processing method provided in the above examples.

The computer-readable medium in the disclosure may be a computer-readable signal medium or a computer-readable storage medium, or any combination of a computer-readable signal medium and a computer-readable storage medium. The computer-readable storage medium may include, but is not limited to, an electronic, magnetic, optical, electromagnetic, infrared, or semiconductor system, apparatus, or device, or any combination of the foregoing. Instances of the computer-readable storage medium may include, but are not limited to, an electrical connection based on one or more wires, a portable computer diskette, a hard disk, an RAM, an ROM, an erasable programmable read-only memory (EPROM or flash memory), an optical fiber, a portable compact disc read-only memory (CD-ROM), an optical storage device, a magnetic storage device, or any suitable combination of the foregoing. In the disclosure, the computer-readable storage medium may be any tangible medium that includes or stores a program for use by or in conjunction with an instruction execution system, apparatus, or device. In the disclosure, the compute-readable signal medium may include a data signal propagating in a baseband or as part of a carry wave and carrying a computer-readable program code. Such a propagated data signal may have a variety of forms and may include, but is not limited to, an electromagnetic signal, an optical signal, or any suitable combination of the foregoing. The computer-readable signal medium may also be any computer-readable medium besides a computer-readable storage medium. The computer-readable signal medium can send, propagate, or transmit a program for use by or in conjunction with an instruction execution system, apparatus, or device. A program code included on a computer-readable medium may be transmitted by means of any suitable medium, including, but not limited to, a wire, a fiber optic cable, radio frequency (RF), etc., or any suitable combination of the foregoing.

In some embodiments, a client side and a server may communicate by using any currently known or future developed network protocol, such as a hypertext transfer protocol (HTTP), and may be interconnected with any form or medium of digital data communication (for example, a communication network). Instances of communication networks include a local area network (LAN), a wide area network (WAN), Internet work (for example, the Internet), and an end-to-end network (for example, an ad hoc end-to-end network), as well as any currently known or future developed network.

The computer-readable medium may be included in the above electronic device, and may also exist independently without being assembled into the electronic device.

The computer-readable medium carries one or more programs. When the one or more programs are executed by the electronic device, the electronic device is caused to:

obtain an image to be processed, where the image to be processed includes a face region, and a skin state of the face region in the image to be processed is at a first skin age; and input the image to be processed into a pre-trained target skin image processing model, and obtain a target effect image corresponding to the image to be processed, where the target skin image processing model is obtained by training an initial skin image processing model according to a sample original image and a sample effect image corresponding to the sample original image, a skin state of a face region in the target effect image is at a second skin age, and the second skin age is less than or equal to the first skin age.

A computer program code for performing operations of the disclosure may be written in one or more programming languages, or combinations of the programming languages. The programming languages include, but are not limited to, object-oriented programming languages, such as Java, Smalltalk, and C++, and further include conventional procedural programming languages, such as the C programming language or similar programming languages. The program code may be executed entirely on a user computer, partly on a user computer, as a stand-alone software package, partly on a user computer and partly on a remote computer, or entirely on a remote computer or server. In the case involving a remote computer, the remote computer may be connected with a user computer through any kind of network, including an LAN or a WAN, or may be connected with an external computer (for example, connected through the Internet by using an Internet service provider).

The flowcharts and block diagrams in the accompanying drawings illustrate the architecture, functionality, and operations possibly implemented by the systems, methods, and computer program products according to the plurality of examples of the disclosure. In this regard, each block in the flowcharts or block diagrams may represent a module, a program segment, or part of a code, and a module, a program segment, or part of a code includes one or more executable instructions for implementing a specified logical function. It should also be noted that in some alternative implementations, a function noted in a block may occur in a different order than an order noted in the figures. For example, two consecutive blocks may actually be executed substantially in parallel, or in a reverse order sometimes, depending on a function involved. It should also be noted that each block in the block diagrams and/or flowcharts, and combinations of blocks in the block diagrams and/or flowcharts, can be implemented by special purpose hardware-based systems that perform specified functions or operations, or can be implemented by combinations of special purpose hardware and computer instructions.

The units described in the example of the disclosure may be implemented in software or hardware. The name of a unit does not constitute a qualification of the unit itself under a circumstance.

The functions described above herein may be executed at least partially by one or more hardware logic components, for example, exemplary types of hardware logic components that may be used include a field programmable gate array (FPGA), an application specific integrated circuit (ASIC), an application specific standard part (ASSP), a system on chip (SOC), a complex programmable logic device (CPLD), etc. in a non-restrictive way.

In the context of the disclosure, the machine-readable medium may be a tangible medium that may include or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. Instances of the machine-readable storage medium may include an electrical connection based on one or more wires, a portable computer diskette, a hard disk, an RAM, an ROM, an EPROM or flash memory, an optical fiber, a CD-ROM, an optical storage device, a magnetic storage device, or any suitable combination of the foregoing.

According to one or more examples of the disclosure, [Instance 1]provides a image processing method. The method includes:

obtain an image to be processed, where the image to be processed includes a face region, and a skin state of the face region in the image to be processed is at a first skin age; and input the image to be processed into a pre-trained target skin image processing model, and obtain a target effect image corresponding to the image to be processed, where the target skin image processing model is obtained by training an initial skin image processing model according to a sample original image and a sample effect image corresponding to the sample original image, a skin state of a face region in the target effect image is at a second skin age, and the second skin age is less than or equal to the first skin age.

According to one or more examples of the disclosure, [Instance 2]provides the image processing method. The method further includes:

the initial skin image processing model includes a generative adversarial network, the generative adversarial network includes a skin image processing generator and a skin image processing discriminator, and the target skin image processing model is obtained by training through the following method:

obtain the sample original image comprising a face region, and determine the sample effect image corresponding to the sample original image, where a skin state of the face region in the sample original image is at the first skin age, a skin state of a face region in the sample effect image is at the second skin age, and the second skin age is less than or equal to the first skin age; and create a training sample set based on a plurality of sample original images and sample effect images corresponding to the sample original images, train the generative adversarial network according to the sample original images and the sample effect images corresponding to the sample original images in the training sample set, and take the skin image processing generator that is trained as the target skin image processing model.

According to one or more examples of the disclosure, [Instance 3]provides the image processing method. The method further includes:

the step of determining the sample effect image corresponding to the sample original image includes:

obtain a preliminary effect image obtained by performing skin age conversion on the face region in the sample original image, and determine the sample effect image according to the preliminary effect image, where the skin age conversion includes at least one of wrinkle fading, dark circle fading, and depression filling.

According to one or more examples of the disclosure, [Instance 4]provides the image processing method. The method further includes:

the step of determining the sample effect image according to the preliminary effect image includes:

perform skin color correction on a face region in the preliminary effect image according to the sample original image, and obtain the sample effect image.

According to one or more examples of the disclosure, [Instance 5]provides the image processing method. The method further includes:

the steps of performing skin color correction on a face region in the preliminary effect image according to the sample original image, and obtaining the sample effect image include:

calculate a first skin color mean value of the face region in the sample original image and a second skin color mean value of the face region in the preliminary effect image; and determine target color values corresponding to a plurality of pixel points of the face region in the preliminary effect image according to the first skin color mean value, the second skin color mean value, and original color values corresponding to the plurality of pixel points of the face region in the preliminary effect image separately, and generate the sample effect image according to the target color values.

According to one or more examples of the disclosure, [Instance 6]provides the image processing method. The method further includes:

the step of calculating a first skin color mean value of the face region in the sample original image includes:

determine the face region in the sample original image, determine a skin region in the face region, and calculate the first skin color mean value of a plurality of pixel points of the skin region.

According to one or more examples of the disclosure, [Instance 7]provides the image processing method. The method further includes:

the step of creating a training sample set based on a plurality of sample original images and sample effect images corresponding to the sample original images includes:

obtain a target original image from the plurality of sample original images and a sample effect image corresponding to the target original image;

perform illumination simulation on the target original image according to a preset illumination condition, obtain a sample augmentation image, perform illumination simulation on the sample effect image corresponding to the target original image according to the preset illumination condition, and obtain a sample effect image corresponding to the sample augmentation image; and take the sample original image and the sample augmentation image as sample input images, take the sample effect image corresponding to the sample original image and the sample effect image corresponding to the sample augmentation image as desired effect images, and create the training sample set according to the sample input images and the desired effect images.

According to one or more examples of the disclosure, [Instance 9]provides the image processing method. The method further includes:

the steps of training the generative adversarial network according to the sample original images and the sample effect images corresponding to the sample original images in the training sample set, and taking the skin image processing generator that is trained as the target skin image processing model include:

input the sample input images of the training sample set into the skin image processing generator in the generative adversarial network, and obtain a sample generation image;

adjust a network parameter of the skin image processing generator according to the sample generation image, the sample input images, and desired effect images corresponding to the sample input images;

train the skin image processing discriminator according to the sample generation image and a desired effect image corresponding to the sample generation image, and determine whether to end adjustment of the skin image processing generator according to a discrimination result for the sample generation image from the trained skin image processing discriminator; and take the adjusted skin image processing generator as the target skin image processing model in response to determining to end adjustment of the skin image processing generator.

According to one or more examples of the disclosure, [Instance 9]provides the image processing method. The method further includes:

the step of adjusting a network parameter of the skin image processing generator according to the sample generation image, the sample input images, and desired effect images corresponding to the sample input images includes:

calculate a first loss value between the sample generation image and the sample input images according to a preset first loss function;

calculate a second loss value between the sample generation image and the desired effect image corresponding to the sample input images according to a preset second loss function; and adjust the network parameter of the skin image processing generator according to the first loss value and the second loss value.

According to one or more examples of the disclosure, [Instance 10] provides a image processing method. The method further includes:

the step of training the generative adversarial network according to the sample original images and the sample effect images corresponding to the sample original images in the training sample set includes:

determine a target iteration training number of the sample original images according to skin ages corresponding to the sample original images in the training sample set and a number of a sample original image corresponding to each skin age, and train the generative adversarial network according to the sample original images, the sample effect images corresponding to the sample original images, and the target iteration training number.

According to one or more examples of the disclosure, [Instance 11] provides a image processing method. The method further includes:

the step of determining a target iteration training number of the sample original images according to skin ages corresponding to the sample original images in the training sample set and a number of sample original images corresponding to each skin age includes:

group the plurality of sample original images in the training sample set according to the skin age corresponding to each sample original image in the training sample set, obtain sample training groups of at least two age groups, and determine a target iteration training number corresponding to each sample training group according to a number of a sample original image corresponding to each sample training group; where a target iteration training number of a sample training group with fewer images is not lower than a target iteration training number of a sample training group with more images.

According to one or more examples of the disclosure, [Instance 12] provides the image processing method. The method further includes:

the step of obtaining an image to be processed includes:

display at least one image obtaining control when a special effect trigger operation for enabling a preset skin processing special effect is received; and receive a control trigger operation for the at least one image obtaining control, and obtain the image to be processed in an image obtaining mode corresponding to a triggered image obtaining control.

According to one or more examples of the disclosure, [Instance 13] provides an apparatus for processing an image. The apparatus includes:

an image obtaining module configured to obtain an image to be processed, where the image to be processed includes a face region, and a skin state of the face region in the image to be processed is at a first skin age; and a skin processing module configured to input the image to be processed into a pre-trained target skin image processing model, and obtain a target effect image corresponding to the image to be processed, where the target skin image processing model is obtained by training an initial skin image processing model according to a sample original image and a sample effect image corresponding to the sample original image, a skin state of a face region in the target effect image is at a second skin age, and the second skin age is less than or equal to the first skin age.

Furthermore, although a plurality of operations are depicted in a particular order, this should not be understood as requiring that such operations be executed in the particular order shown or in a sequential order. In certain circumstances, multitasking and parallel processing may be advantageous. Similarly, although a plurality of implementation details are included in the above discussion, these details should not be construed as limitations on the scope of the disclosure. Some features that are described in the context of separate examples may also be implemented in combination in a single example. Conversely, a plurality of features described in the context of a single example can also be implemented in multiple examples separately or in any suitable sub-combination manner.

I claim:

1. A image processing method, comprising:

obtaining an image to be processed, wherein the image to be processed comprises a face region, and a skin state of the face region in the image to be processed is at a first skin age;

inputting the image to be processed into a pre-trained target skin image processing model obtained to obtain a target effect image corresponding to the image to be processed, wherein the target skin image processing model is obtained by training an initial skin image processing model according to a sample original image and a sample effect image corresponding to the sample original image, a skin state of a face region in the target effect image is at a second skin age, and the second skin age is less than or equal to the first skin age;

wherein the initial skin image processing model comprises a generative adversarial network, the generative adversarial network comprises a skin image processing generator and a skin image processing discriminator, and the target skin image processing model is obtained by training through the following method:

obtaining the sample original image comprising a face region, and determining the sample effect image corresponding to the sample original image, wherein a skin state of the face region in the sample original image is at the first skin age, and a skin state of a face region in the sample effect image is at the second skin age;

creating a training sample set based on a plurality of sample original images and sample effect images corresponding to the sample original images, training the generative adversarial network according to the sample original images and the sample effect images corresponding to the sample original images in the training sample set, and taking the skin image processing generator that is trained as the target skin image processing model;

wherein the training the generative adversarial network according to the sample original images and the sample effect images corresponding to the sample original images in the training sample set comprises:

determining a target iteration training number of the sample original images according to skin ages corresponding to the sample original images in the training sample set and a number of a sample original image corresponding to each skin age, and training the generative adversarial network according to the sample original images, the sample effect images corresponding to the sample original images, and the target iteration training number.

2. The method according to claim 1, wherein the determining the sample effect image corresponding to the sample original image comprises:

obtaining a preliminary effect image obtained by performing skin age conversion on the face region in the sample original image, and determining the sample effect image according to the preliminary effect image, wherein the skin age conversion comprises at least one of wrinkle fading, dark circle fading, and depression filling.

3. The method according to claim 2, wherein the determining the sample effect image according to the preliminary effect image comprises:

performing skin color correction on a face region in the preliminary effect image according to the sample original image, and obtaining the sample effect image.

4. The method according to claim 3, wherein the performing skin color correction on a face region in the preliminary effect image according to the sample original image, and obtaining the sample effect image comprise:

calculating a first skin color mean value of the face region in the sample original image and a second skin color mean value of the face region in the preliminary effect image; and determining target color values corresponding to a plurality of pixel points of the face region in the preliminary effect image according to the first skin color mean value, the second skin color mean value, and original color values corresponding to the plurality of pixel points of the face region in the preliminary effect image separately, and generating the sample effect image according to the target color values.

5. The method according to claim 4, wherein the calculating a first skin color mean value of the face region in the sample original image comprises:

determining the face region in the sample original image, determining a skin region in the face region, and calculating the first skin color mean value of a plurality of pixel points of the skin region.

6. The method according to claim 1, wherein the creating a training sample set based on a plurality of sample original images and sample effect images corresponding to the sample original images comprises:

obtaining a target original image from the plurality of sample original images and a sample effect image corresponding to the target original image;

performing illumination simulation on the target original image according to a preset illumination condition, obtaining a sample augmentation image, performing illumination simulation on the sample effect image corresponding to the target original image according to the preset illumination condition, and obtaining a sample effect image corresponding to the sample augmentation image; and taking the sample original image and the sample augmentation image as sample input images, taking the sample effect image corresponding to the sample original image and the sample effect image corresponding to the sample augmentation image as desired effect images, and creating the training sample set according to the sample input images and the desired effect images.

7. The method according to claim 6, wherein the training the generative adversarial network according to the sample original images and the sample effect images corresponding to the sample original images in the training sample set, and taking the skin image processing generator that is trained as the target skin image processing model comprise:

inputting the sample input images of the training sample set into the skin image processing generator in the generative adversarial network, and obtaining a sample generation image;

adjusting a network parameter of the skin image processing generator according to the sample generation image, the sample input images, and desired effect images corresponding to the sample input images;

training the skin image processing discriminator according to the sample generation image and a desired effect image corresponding to the sample generation image, and determining whether to end adjustment of the skin image processing generator according to a discrimination result for the sample generation image from the trained skin image processing discriminator; and taking the adjusted skin image processing generator as the target skin image processing model in response to determining to end adjustment of the skin image processing generator.

8. The method according to claim 7, wherein the adjusting a network parameter of the skin image processing generator according to the sample generation image, the sample input images, and desired effect images corresponding to the sample input images comprises:

calculating a first loss value between the sample generation image and the sample input images according to a preset first loss function;

calculating a second loss value between the sample generation image and the desired effect images corresponding to the sample input images according to a preset second loss function; and adjusting the network parameter of the skin image processing generator according to the first loss value and the second loss value.

9. The method according to claim 1, wherein the determining a target iteration training number of the sample original images according to skin ages corresponding to the sample original images in the training sample set and a number of a sample original image corresponding to each skin age comprises:

grouping the plurality of sample original images in the training sample set according to the skin age corresponding to each sample original image in the training sample set, obtaining sample training groups of at least two age groups, and determining a target iteration training number corresponding to each sample training group according to a number of a sample original image corresponding to each sample training group; wherein;

a target iteration training number of a sample training group with fewer images is not lower than a target iteration training number of a sample training group with more images.

10. The method according to claim 1, wherein the obtaining an image to be processed comprises:

displaying at least one image obtaining control when a special effect trigger operation for enabling a preset skin processing special effect is received; and receiving a control trigger operation for the at least one image obtaining control, and obtaining the image to be processed in an image obtaining mode corresponding to a triggered image obtaining control.

11. An electronic device, comprising:

at least one processor; and a storage apparatus configured to store at least one program; wherein when the at least one program is executed by the at least one processor, the at least one processor is caused to:

obtain an image to be processed, wherein the image to be processed comprises a face region, and a skin state of the face region in the image to be processed is at a first skin age; and input the image to be processed into a pre-trained target skin image processing model obtained to obtain a target effect image corresponding to the image to be processed, wherein the target skin image processing model is obtained by training an initial skin image processing model according to a sample original image and a sample effect image corresponding to the sample original image, a skin state of a face region in the target effect image is at a second skin age, and the second skin age is less than or equal to the first skin age;

wherein the initial skin image processing model comprises a generative adversarial network, the generative adversarial network comprises a skin image processing generator and a skin image processing discriminator, and the target skin image processing model is obtained by training through the at least one program which, when executed by the at least one processor, cause the at least one processor to:

obtain the sample original image comprising a face region, and determine the sample effect image corresponding to the sample original image, wherein a skin state of the face region in the sample original image is at the first skin age, and a skin state of a face region in the sample effect image is at the second skin age;

create a training sample set based on a plurality of sample original images and sample effect images corresponding to the sample original images, train the generative adversarial network according to the sample original images and the sample effect images corresponding to the sample original images in the training sample set, and take the skin image processing generator that is trained as the target skin image processing model;

wherein the training the generative adversarial network according to the sample original images and the sample effect images corresponding to the sample original images in the training sample set comprises:

determining a target iteration training number of the sample original images according to skin ages corresponding to the sample original images in the training sample set and a number of a sample original image corresponding to each skin age, and training the generative adversarial network according to the sample original images, the sample effect images corresponding to the sample original images, and the target iteration training number.

12. A computer program product, comprising a computer program carried on a non-transitory computer-readable medium, wherein the computer program comprises a program code when executed by a processor, causes the processor to:

obtain an image to be processed, wherein the image to be processed comprises a face region, and a skin state of the face region in the image to be processed is at a first skin age; and input the image to be processed into a pre-trained target skin image processing model obtained to obtain a target effect image corresponding to the image to be processed, wherein the target skin image processing model is obtained by training an initial skin image processing model according to a sample original image and a sample effect image corresponding to the sample original image, a skin state of a face region in the target effect image is at a second skin age, and the second skin age is less than or equal to the first skin age;

wherein the initial skin image processing model comprises a generative adversarial network, the generative adversarial network comprises a skin image processing generator and a skin image processing discriminator, and the target skin image processing model is obtained by training through the computer program which, when executed by the processor, cause the processor to:

obtain the sample original image comprising a face region, and determine the sample effect image corresponding to the sample original image, wherein a skin state of the face region in the sample original image is at the first skin age, and a skin state of a face region in the sample effect image is at the second skin age;

create a training sample set based on a plurality of sample original images and sample effect images corresponding to the sample original images, train the generative adversarial network according to the sample original images and the sample effect images corresponding to the sample original images in the training sample set, and take the skin image processing generator that is trained as the target skin image processing model;

wherein the training the generative adversarial network according to the sample original images and the sample effect images corresponding to the sample original images in the training sample set comprises:

determining a target iteration training number of the sample original images according to skin ages corresponding to the sample original images in the training sample set and a number of a sample original image corresponding to each skin age, and training the generative adversarial network according to the sample original images, the sample effect images corresponding to the sample original images, and the target iteration training number.

13. The electronic device according to claim 11, wherein the at least one program that causes the at least one processor to determine the sample effect image corresponding to the sample original image comprises at least one program that causes the at least one processor to:

obtain a preliminary effect image obtained by performing skin age conversion on the face region in the sample original image, and determining the sample effect image according to the preliminary effect image, wherein the skin age conversion comprises at least one of wrinkle fading, dark circle fading, and depression filling.

14. The electronic device according to claim 13, wherein the at least one program that causes the at least one processor to determine the sample effect image according to the preliminary effect image comprises at least one program that causes the at least one processor to:

perform skin color correction on a face region in the preliminary effect image according to the sample original image, and obtaining the sample effect image.

15. The electronic device according to claim 14, wherein the at least one program that causes the at least one processor to perform skin color correction on a face region in the preliminary effect image according to the sample original image, and obtain the sample effect image comprises at least one program that causes the at least one processor to:

calculate a first skin color mean value of the face region in the sample original image and a second skin color mean value of the face region in the preliminary effect image; and determine target color values corresponding to a plurality of pixel points of the face region in the preliminary effect image according to the first skin color mean value, the second skin color mean value, and original color values corresponding to the plurality of pixel points of the face region in the preliminary effect image separately, and generate the sample effect image according to the target color values.

16. The electronic device according to claim 15, wherein the at least one program that causes the at least one processor to calculate the first skin color mean value of the face region in the sample original image comprises at least one program that causes the at least one processor to:

determine the face region in the sample original image, determine a skin region in the face region, and calculate the first skin color mean value of a plurality of pixel points of the skin region.

17. The electronic device according to claim 11, wherein the at least one program that causes the at least one processor to create a training sample set based on a plurality of sample original images and sample effect images corresponding to the sample original images comprises at least one program that causes the at least one processor to:

obtain a target original image from the plurality of sample original images and a sample effect image corresponding to the target original image;

perform illumination simulation on the target original image according to a preset illumination condition, obtain a sample augmentation image, perform illumination simulation on the sample effect image corresponding to the target original image according to the preset illumination condition, and obtain a sample effect image corresponding to the sample augmentation image; and take the sample original image and the sample augmentation image as sample input images, take the sample effect image corresponding to the sample original image and the sample effect image corresponding to the sample augmentation image as desired effect images, and create the training sample set according to the sample input images and the desired effect images.

* * * * *